Oct. 2, 1962       H. KORB       3,056,404
AMPULE FOR INJECTIONS
Filed March 24, 1959

INVENTOR:
HERBERT KORB
by Mestern & Kollin
ATTORNEYS

United States Patent Office 3,056,404
Patented Oct. 2, 1962

3,056,404
AMPULE FOR INJECTIONS
Herbert Korb, Koln-Braunsfeld, Germany, assignor to Rota Apparate- und Maschinenbau Dr. Hennig K.G. Aachen, Oeflingen, Baden, Germany, a company of Germany
Filed Mar. 24, 1959, Ser. No. 801,512
3 Claims. (Cl. 128—220)

Ampules for injections now in use all have in common the disadvantage that they are not a glass body which is closed entirely in contrast to the conventional ampule which is regarded as an ideal container for medications. The injection ampules all are provided with an exposed piston made of an elastic material, and some even have additional closure elements with elastic layers. For this reason, medications kept in these injection ampules have a much shorter storage life than those packed in conventional ampules.

To avoid this disadvantage, an injection ampule had been proposed based on the principle of the dual neck ampule. On the inside of the latter, there is a slidable piston provided with a female thread. After cutting of one neck, a rod is screwed into the piston, and the latter can be moved therewith toward the opposite neck. The opposite neck also is cut off, and a tube is placed upon the remainder of the neck and tightened thereto by a rubber gasket. Such an ampule has the following important drawbacks:

(1) The neck on which the tube is to be applied is exposed and hence is not sterile. Upon injection, therefore, the danger exists that the compound to be injected also loses its sterility.

(2) A normal tube with internal cone cannot be used.

(3) The needle must be secured and tightened to the tube by means of elastic gaskets.

(4) The ampule must be opened immediately at the space holding the medication so that glass splinters can enter the medication.

(5) Throught the friction of the cut-off neck on the inside of the tube, additional glass splinters can form which, upon administration of the injection, may enter the tissue or even the blood vessels.

(6) The ampule must be opened at a second point whereby the readiness for use is impaired.

According to the present invention, an ampule for injections consists of a glass body which is closed on all sides and of a perforated piston slidably disposed therein. This piston, on the side opposite the medication, carries a likewise perforated extension having a cone for attaching a standard tube with standard internal cone thereto. The glass body or container is to be opened for use on the side opposite the medication and past the piston at a point prepared for that purpose, and the injection tube is attached. The ampule then is ready for use. The use of the ampule also can be facilitated by attaching a dual wing handle, as commonly employed, at a place prepared for such attachment on the piston below the injection needle.

The ampule for injection according to the invention, before readying for use, is a hermetically sealed glass body so that an evaporation of liquid medications or a penetration of steam into the container cannot occur and spoiling of the medication is prevented. The piston, slidably disposed above the medication container, seals the latter tightly. Splinters which may form upon opening of the glass container hence cannot enter the medication space. The piston with its cone can be cast or molded with such close tolerances that a tight and secure seat of the injection tube is assured without elastic gaskets.

Two embodiments of the invention are illustrated in the accompanying drawings. However, it should be understood that these are given merely by way of explanation, not of limitation, and that numerous changes may be made in the details without departing from the spirit and the scope of the present invention as hereinafter claimed.

Figure 1:
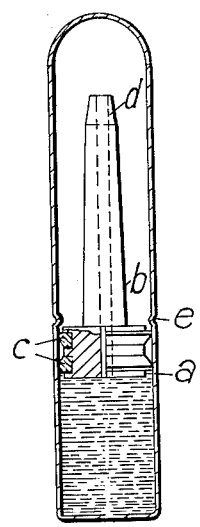
FIG. 1 is a longitudinal section through a fully closed glass body with the piston.

Referring now to these drawings, in FIG. 1 a totally closed glass body $a$ is shown the lower part of which is filled with the medication. $b$ is a perforated piston with extension which can slide in the axial direction of the glass body or container $a$. The piston is sealed against the container wall by one or more rings $c$ made of an elastic material. Piston $b$, at the upper end of its extension is provided with a cone $d$ to which an injection tube having an internal cone can be attached. The container $a$ is prepared for opening by, e.g., a recess or a spot under tension $e$, where it is cut, and the upper part broken off. The injection tube then is placed on the cone $d$ and is inserted in the tissue or blood vessel while holding on to the piston extension.

By pushing the container up against the piston, the medication enters through the perforation into the tube. When a transparent or translucent material is employed for the piston, the aspiration control for this ampule is carried out in a particularly favorable manner. In the small diameter below the cone a drop of blood becomes visible during suction by a slight pull on the container. This shows conclusively that a blood vessel has been struck.

Figure 2:
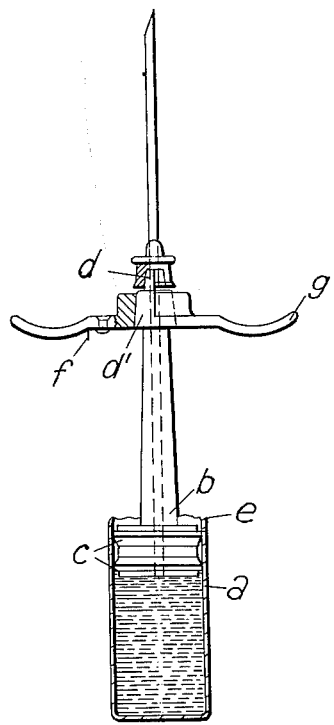
FIG. 2 is a longitudinal section through a cut-off ampule ready for use.

FIG. 2 shows a cut-off injection ampule ready for use which has a piston designed for attachment of a handle. $a$ is the remainder of the container or glass body, the upper part of which had been cut off at point $e$. $b$ is the piston with extension, $c$ are the sealing rings, not cut in this case. $d$ is the cone for attaching the needle. $d'$ is a cone to accept the handle $g$ which is secured from lifting during aspiration by a tightener $f$, consisting of a flat metal piece $i$ or of any other material which is provided with a slit $k$ on the side. This is inserted in a groove $h$ on the piston rod and thereby tightly connected for injections and aspirations.

I claim as my invention:

1. An ampule for injections comprising a totally closed cylindrical glass container for holding a medication and capable of being opened by cutting, said container having a flat bottom and a rounded top and being devoid of protuberances and narrowed extensions; a perforated piston slidably disposed in said container; a perforated extension on said piston, ending in a cone; and a recess in the wall of said container at substantially one-third its height, measured from the bottom, to facilitate opening.

2. An ampule for injections comprising a totally closed glass container for holding a medication which can be opened by cutting; a perforated piston slidably disposed in said container; a perforated extension on said piston ending in a cone capable of accommodating, after cutting, an injection tube having an internal cone fitting; and a recess in the wall of said container opposite the medication to facilitate opening.

3. An ampule for injections comprising a totally closed cylindrical glass container for holding medications in its lower third, said container having a flat bottom and a rounded top and being devoid of protuberances and narrowed extensions; a perforated piston slidably disposed in said container; a perforated extension on said piston ending in a cone and capable of accommodating, after cutting, an injection tube having an internal cone fitting; and a recess in the wall of said container above said medication and substantially one-third the height from the bottom of said container, to facilitate opening.

References Cited in the file of this patent

UNITED STATES PATENTS

| | | |
|---|---|---|
| 977,952 | Heimann | Dec. 6, 1910 |
| 1,817,003 | Hein | Aug. 4, 1931 |
| 2,456,001 | Jones | Dec. 14, 1948 |
| 2,896,622 | Huttermann | July 28, 1959 |

FOREIGN PATENTS

| | | |
|---|---|---|
| 79,010 | Denmark | Mar. 7, 1955 |
| 302,265 | Great Britain | Dec. 10, 1928 |